United States Patent
Kobayashi et al.

(10) Patent No.: US 6,932,479 B2
(45) Date of Patent: Aug. 23, 2005

(54) IMAGE PROCESSING SYSTEM, PROJECTOR, PROGRAM, INFORMATION STORAGE MEDIUM AND IMAGE PROCESSING METHOD

(75) Inventors: Masanobu Kobayashi, Suwa (JP); Osamu Wada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/757,442

(22) Filed: Jan. 15, 2004

(65) Prior Publication Data

US 2004/0201825 A1 Oct. 14, 2004

(30) Foreign Application Priority Data

Jan. 17, 2003 (JP) .................................... 2003-009690

(51) Int. Cl.[7] .............................................. G03B 21/00
(52) U.S. Cl. ........................ 353/69; 353/70; 348/807
(58) Field of Search ......................... 353/69, 70, 101, 353/122; 348/806, 807; 345/207

(56) References Cited

U.S. PATENT DOCUMENTS

| 5,200,815 | A | * | 4/1993 | Tsujihara et al. ........... 348/181 |
| 5,298,985 | A | * | 3/1994 | Tsujihara et al. ........... 348/745 |
| 5,519,447 | A | * | 5/1996 | Shima et al. ................ 348/556 |
| 5,532,765 | A | * | 7/1996 | Inoue et al. ................. 348/807 |
| 6,002,454 | A | * | 12/1999 | Kajiwara et al. ........... 348/806 |
| 6,367,933 | B1 | | 4/2002 | Chen et al. |
| 6,741,295 | B2 | * | 5/2004 | Nieuwenhuizen et al. .. 348/687 |
| 2003/0086026 | A1 | * | 5/2003 | Kim ............................ 348/806 |

FOREIGN PATENT DOCUMENTS

| JP | A 2000-241874 | 9/2000 |
| JP | A 2002-44571 | 2/2002 |
| JP | A 2002-247614 | 8/2002 |
| WO | WO 02/101443 A2 | 12/2002 |

OTHER PUBLICATIONS

Rahul Sukthankar et al.; "Automatic Keystone Correction for Camera–Assisted Presentation Interfaces"; XP–001148734; Oct. 14, 2000; pp 607–614.

J. Goel et al.; 18.4: Correcting Distortions in Digital Displays and Projectors Using Real–Time Digital Image Warping; XP008014374; SID 99 DIGEST; May 18, 1999; pp 232–241.

Ramesh Raskar et al.; "A Self–Correcting Projector"; XP–002277258; IEEE; 2001; pp II–504–II–508.

* cited by examiner

Primary Examiner—William C. Dowling
(74) Attorney, Agent, or Firm—Oliff & Berridge, PLC

(57) ABSTRACT

To provide an image processing system and the like which can correct a distortion in a projected image automatically and adequately, a projector has an area sensor section which senses a sensing region onto which an image is projected and outputs sensing information; a storage section which stores angle correction data in which the ratio of average luminance values for a plurality of different regions in the projection area is associated with derivation coordinates for deriving coordinates of the projection area, and also stores coordinate data indicating the derivation coordinates for the projection area; luminance-distribution analyzing section which refers to the angle correction data based on the sensing information and depending on the luminance distribution in the projection area and corrects the derivation coordinates in the coordinate data, based on the angle correction data; and a distortion correction section which corrects the image signals so that the distortion in the projected image is corrected, based on the coordinate data.

11 Claims, 12 Drawing Sheets

FIG. 5A

|   | x | y |
|---|---|---|
| A | 0 | 0 |
| B | 0 | 767 |
| C | 1023 | 767 |
| D | 1023 | 0 |

|   | x | y |
|---|---|---|
| A' | 134 | 1 |
| B' | 0 | 767 |
| C' | 1020 | 693 |
| D' | 871 | 74 |

| RH | RV | A' | | B' | | C' | | D' | |
|---|---|---|---|---|---|---|---|---|---|
| | | x | y | x | y | x | y | x | y |
| 1 | 1 | 0 | 0 | 0 | 767 | 1023 | 767 | 1023 | 0 |
| 1.1 | 1 | 16 | 12 | 16 | 755 | 1023 | 767 | 1023 | 0 |
| 1.2 | 1 | 32 | 24 | 32 | 743 | 1023 | 767 | 1023 | 0 |
| 1.3 | 1 | 48 | 36 | 48 | 731 | 1023 | 767 | 1023 | 0 |
| ⋮ | ⋮ | ⋮ | ⋮ | ⋮ | ⋮ | ⋮ | ⋮ | ⋮ | ⋮ |

124

IMAGE PROCESSING SYSTEM, PROJECTOR, PROGRAM, INFORMATION STORAGE MEDIUM AND IMAGE PROCESSING METHOD

Japanese Patent Application No. 2003-9690 filed on Jan. 17, 2003 is hereby incorporated in its entirety.

BACKGROUND OF THE INVENTION

The present invention relates to an image processing system, projector, program, information storage medium and image processing method which can correct a distortion in a projected image such as keystone distortion and rotation.

Various kinds of techniques for correcting a distortion in an image projected by a projector such as so-called keystone distortion have been proposed.

For example, a technique for detecting an inclination in a projector and automatically correcting a vertical distortion is known in the art.

However, such a technique cannot allow a user to correct a horizontal distortion.

For such a reason, the user must use a technique of manually correcting the horizontal distortion by operating a correction switch in a remote controller while viewing an image to be corrected.

However, such a manual operation takes time. In addition, it is difficult to perform an adequate correction in the manual manner.

In view of such a problem, for example, Japanese Patent Laid-Open Application No. 2000-241874 proposes a system in which a projection plane is imaged or taken by means of a camera and the opposed sides in the projection area is compared in length with each other to sense a distortion which is in turn corrected based on the sensed result.

However, the camera used in this Japanese Patent Laid-Open Application is included in the main projector body so that the optical axis of the camera is substantially identical with that of a lens. Thus, the projection area shown by the taken image is always of substantially rectangular shape. It is therefore difficult to compare the length of the opposed sides in the projection area based on the taken image.

BRIEF SUMMARY OF THE INVENTION

The present invention is made in view of the above-mentioned problem and may provide an image processing system, projector, program, information storage medium and image processing method which can correct a distortion in a projected image adequately and automatically.

To this end, an image processing system according to one aspect of the present invention comprises:

sensing means for sensing a sensing region onto which a predetermined image is projected and for outputting sensing information;

luminance distribution analysis means for analyzing a luminance distribution in a projection area included in the sensing region, based on the sensing information;

storage means for storing angle correction data in which ratio of average luminance values for a plurality of different regions in the projection area is associated with derivation coordinates for deriving coordinates of the projection area, and also for storing coordinate data indicating the derivation coordinates for the projection area; and image signal correction means for correcting image signals based on the coordinate data so that a distortion in the projected image is corrected, wherein the luminance distribution analysis means refers to the angle correction data depending on the luminance distribution in the projection area to correct the derivation coordinates in the coordinate data based on the angle correction data.

An image processing system according to another aspect of the present invention comprises:

a sensing section which senses a sensing region onto which a predetermined image is projected and for outputting sensing information;

a luminance distribution analysis section which analyzes a luminance distribution in a projection area included in the sensing region, based on the sensing information;

a storage section which stores angle correction data in which ratio of average luminance values for a plurality of different regions in the projection area is associated with derivation coordinates for deriving coordinates of the projection area, and also for storing coordinate data indicating the derivation coordinates for the projection area; and an image signal correction section which corrects image signals based on the coordinate data so that a distortion in the projected image is corrected, wherein the luminance distribution analysis section refers to the angle correction data depending on the luminance distribution in the projection area to correct the derivation coordinates in the coordinate data based on the angle correction data.

A projector according to a further aspect of the present invention comprises:

sensing means for sensing a sensing region onto which a predetermined image is projected and for outputting sensing information;

luminance distribution analysis means for analyzing a luminance distribution in a projection area included in the sensing region, based on the sensing information;

storage means for storing angle correction data in which ratio of average luminance values for a plurality of different regions in the projection area is associated with derivation coordinates for deriving coordinates of the projection area, and also for storing coordinate data indicating the derivation coordinates for the projection area; and image signal correction means for correcting image signals based on the coordinate data so that a distortion in the projected image is corrected; and image projection means for projecting an image based on the corrected image signals, wherein the luminance distribution analysis means refers to the angle correction data depending on the luminance distribution in the projection area to correct the derivation coordinates in the coordinate data based on the angle correction data.

A projector according to a still further aspect of the present invention comprises:

a sensing section which senses a sensing region onto which a predetermined image is projected and for outputting sensing information;

a luminance distribution analysis section which analyzes a luminance distribution in a projection area included in the sensing region, based on the sensing information;

a storage section which stores angle correction data in which ratio of average luminance values for a plurality of different regions in the projection area is associated with derivation coordinates for deriving coordinates of the projection area, and also for storing coordinate data indicating the derivation coordinates for the projection area; and an image signal correction section which corrects image signals based on the coordinate data so that a distortion in the projected image is corrected; and an image projection section which projects an image based on the corrected image signals, wherein the luminance distribution analysis section refers to the angle correction data depending on the luminance distribution in the projection area to correct the derivation coordinates in the coordinate data based on the angle correction data.

A program according to an even further aspect of the present invention is a computer-readable program for causing a computer to function as:

sensing control means for causing sensing means to sense a sensing region onto which a predetermined image is projected and for outputting sensing information;

luminance distribution analysis means for analyzing a luminance distribution in a projection area included in the sensing region, based on the sensing information;

storage control means for storing region angle correction data in which ratio of average luminance values for a plurality of different regions in the projection area is associated with derivation coordinates for deriving coordinates of the projection area at a predetermined storage, and also for storing coordinate data indicating the derivation coordinates for the projection area at the predetermined storage; and image signal correction means for correcting image signals based on the coordinate data so that a distortion in the projected image is corrected, wherein the luminance distribution analysis means refers to the angle correction data depending on the luminance distribution in the projection area to correct the derivation coordinates in the coordinate data based on the angle correction data.

A program according to a yet further aspect of the present invention is a computer-readable information storage medium which stores the above program.

An image processing method according to an even more further aspect of the present invention comprises:

sensing a sensing region onto which a predetermined image is projected and outputting sensing information;

analyzing a luminance distribution in a projection area included in the sensing region, based on the sensing information;

referring angle correction data in which ratio of average luminance values for a plurality of different regions in the projection area is associated with derivation coordinates for deriving coordinates of the projection area;

correcting the derivation coordinates in coordinate data indicating the derivation coordinates for the projection area based on the angle correction data; and correcting image signals based on the coordinate data so that a distortion in the projected image is corrected.

In accordance with the present invention, the image processing system and the like determine the distortion in the projection area based on the luminance distribution. Thus, the image processing system and the like can adequately determine any distortion in the image even if it is difficult to determine the distortion in the image from the shape thereof due to the fact that the optical axis of a projected light is substantially the same as the optical axis of the sensing means. Thus, the image processing system and the like can correct the distortion in the projected image adequately and automatically.

The image processing system and projector may include ambient information analysis means for determining the projection area and a screen region included in the sensing region based on the luminance distribution according to the sensing information when a rectangular image is to be projected on a rectangular screen, and for updating four derivation coordinates in the coordinate data based on positional information of each vertex in the determined projection area and screen region and derivation coordinate information of four corners in the screen region.

The program and information storage medium may cause the computer to function as ambient information analysis means for determining the projection area and a screen region included in the sensing region based on the luminance distribution according to the sensing information when a rectangular image is to be projected on a rectangular screen, and for updating four derivation coordinates in the coordinate data based on positional information of each vertex in the determined projection area and screen region and derivation coordinate information of four corners in the screen region.

The image processing method may include:

determining the projection area and a screen region included in the sensing region based on the luminance distribution according to the sensing information when a rectangular image is to be projected on a rectangular screen; and updating four derivation coordinates in the coordinate data based on positional information of each vertex in the determined projection area and screen region and derivation coordinate information of four corners in the screen region.

In such a manner, the image processing system and the like can adequately correct any distortion in the image by using positional information for each vertex in the rectangular screen region to update the four derivation coordinates in the coordinate data.

The image processing system and projector may include environment analysis means for determining a lighter state or a darker state based on the luminance information according to the sensing information, the lighter state being a state lighter than a predetermined state and the darker state being a state darker than the predetermined state, and in the lighter state, the ambient information analysis means may update the derivation coordinates in the coordinate data, and in the darker state, the luminance distribution analysis means may update the derivation coordinates in the coordinate data.

The program and information storage medium may cause the computer to function as environment analysis means for determining a lighter state or a darker state based on the luminance information according to the sensing information, the lighter state being a state lighter than a predetermined state and the darker state being a state darker than the predetermined state, and in the lighter state, the ambient information analysis means may update the derivation coordinates in the coordinate data, and in the darker state, the luminance distribution analysis means may update the derivation coordinates in the coordinate data.

The image processing method may comprise:

determining a lighter state or a darker state based on the luminance information according to the sensing information;

in the lighter state, updating four derivation coordinates in the coordinate data based on the positional information and derivation coordinate information for four corners in the screen region; and in the darker state, analyzing the luminance distribution in the projection area based on the sensing information; referring to the angle correction data depending on the luminance distribution in the projection area, and correcting the derivation coordinates in the coordinate data based on the angle correction data.

Thus, the image processing system and the like can automatically and adequately correct any distortion in the projected image by correcting the derivation coordinates in the coordinate data in a manner which suits with the actual operating environment.

BRIEF DESCRIPTION OF THE SEVERAL VIEWS OF THE DRAWING

FIG. 5A shows the contents of coordinate data before corrected, and FIG. 5B shows the contents of coordinate data after corrected.

FIG. 6 shows the data structure of angle correction data according to one example of this embodiment.

DETAILED DESCRIPTION OF THE EMBODIMENT

The present invention will now be described in connection with an example in which the present invention is applied to a projector functioning as an image processing system for correcting a keystone distortion in a projected image and with reference to the accompanying drawing. In addition, an embodiment shown in the following is not intended to limit the subject matter of the invention as described in the accompanying claims. All the components shown in such an embodiment is not necessarily essential for practicing the invention defined by the accompanying claims.

Entire System

Figure 1:
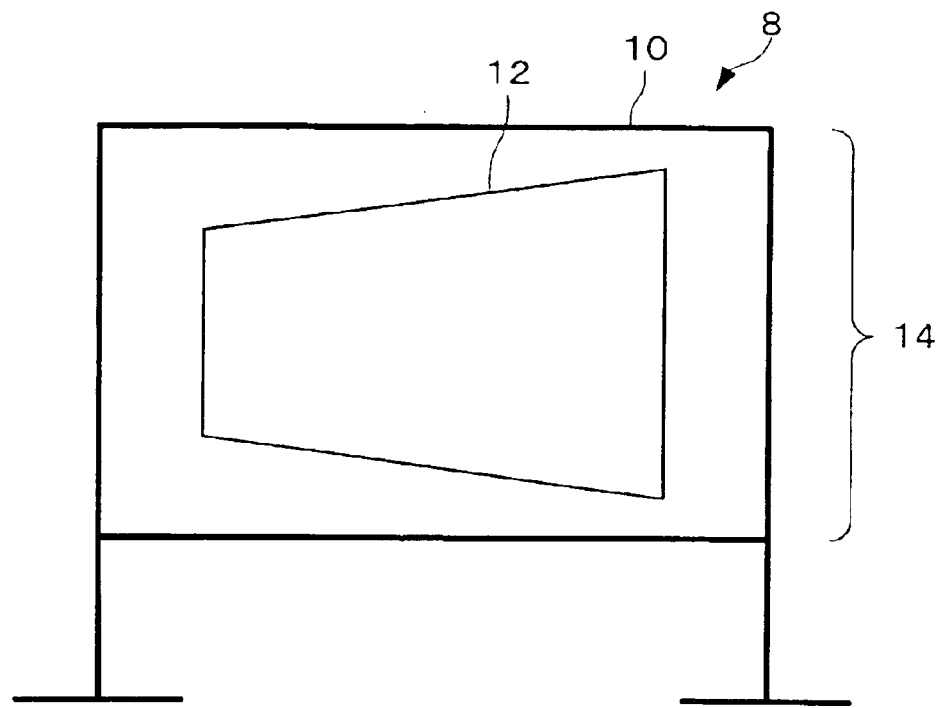
FIG. 1 shows an image which has a keystone distortion.
Figure 1:
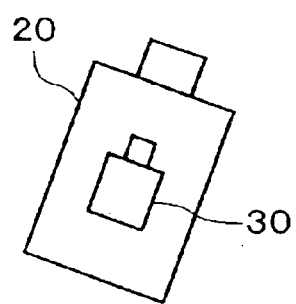

FIG. 1 shows an image which has a keystone distortion.

For example, if a projector 20, which is a kind of image processing system, disposed leftward in front of a rectangular screen 8 projects a rectangular image without image correction, a projection area 12 will be in the form of a trapezoid having its shortest left end and its longest right end, as shown in FIG. 1.

In this embodiment, a sensor 30, which functions as sensing means, senses a sensing region 14 including the projection area 12 and a screen region 10.

Figure 2:
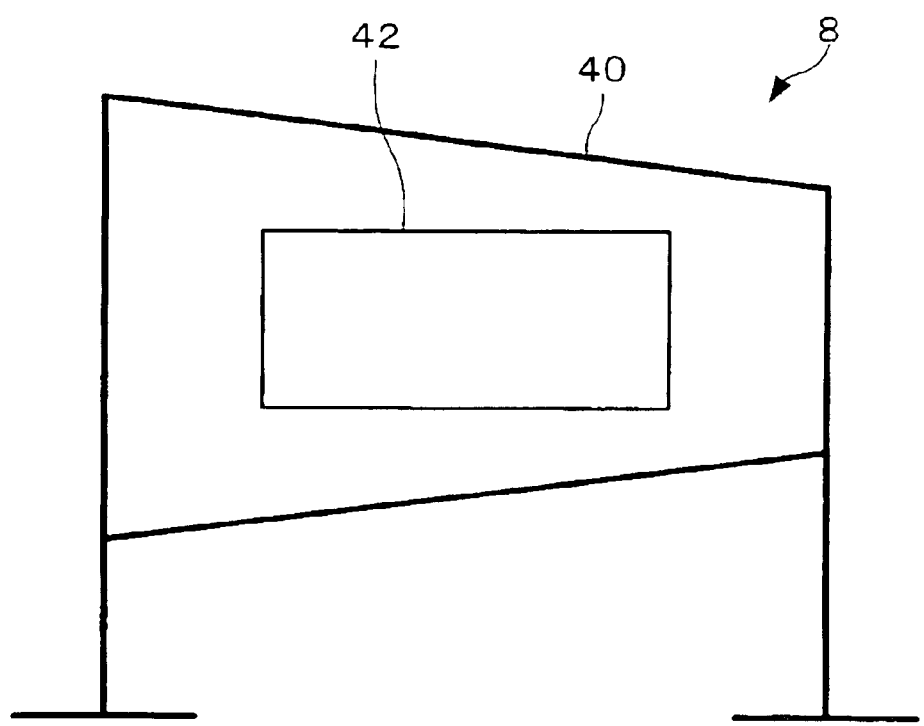
FIG. 2 shows an image which is sensed by a sensor mounted in a projector.

FIG. 2 shows an image which is sensed by the sensor 30 mounted in the projector 20.

For example, if the sensor 30 senses an image with its optical axis approximately identical with the optical axis of a lens in the projector 20, the sensed image on a projection area 42 in the screen region 40 seems to be a rectangular non-distorted image.

However, the projection area 12 is actually distorted as viewed from the front of the screen 8, as shown in FIG. 1.

This embodiment is designed to correct an image according to a luminance distribution on the sensing region 14.

Figure 3:
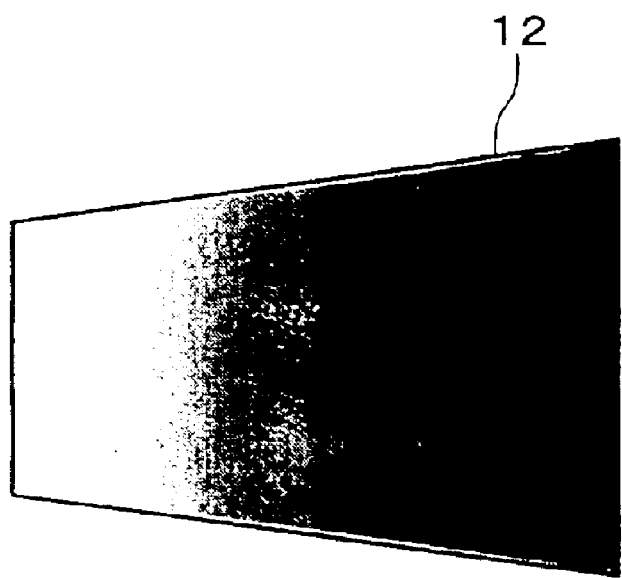
FIG. 3 is a schematic diagram showing a difference of brightness in an image.

FIG. 3 is a schematic diagram showing a difference of brightness in an image.

For example, if a monochromatic image is projected from the left and front side of the screen 8 as shown in FIG. 1, the projection area 12 will have its left side having the maximum luminance value and its right side having the minimum luminance value.

This embodiment is designed to correct the image depending on its distortion which is detected based on the luminance distribution in the projection area 12. Thus, the image distortion can adequately be detected, even if the image is sensed by the sensor 30 with its optical axis approximately identical with the optical axis of the lens in the projector 20.

Functional Blocks

Next, the functional blocks in the projector 20 for implementing such a function are explained.

Figure 4:
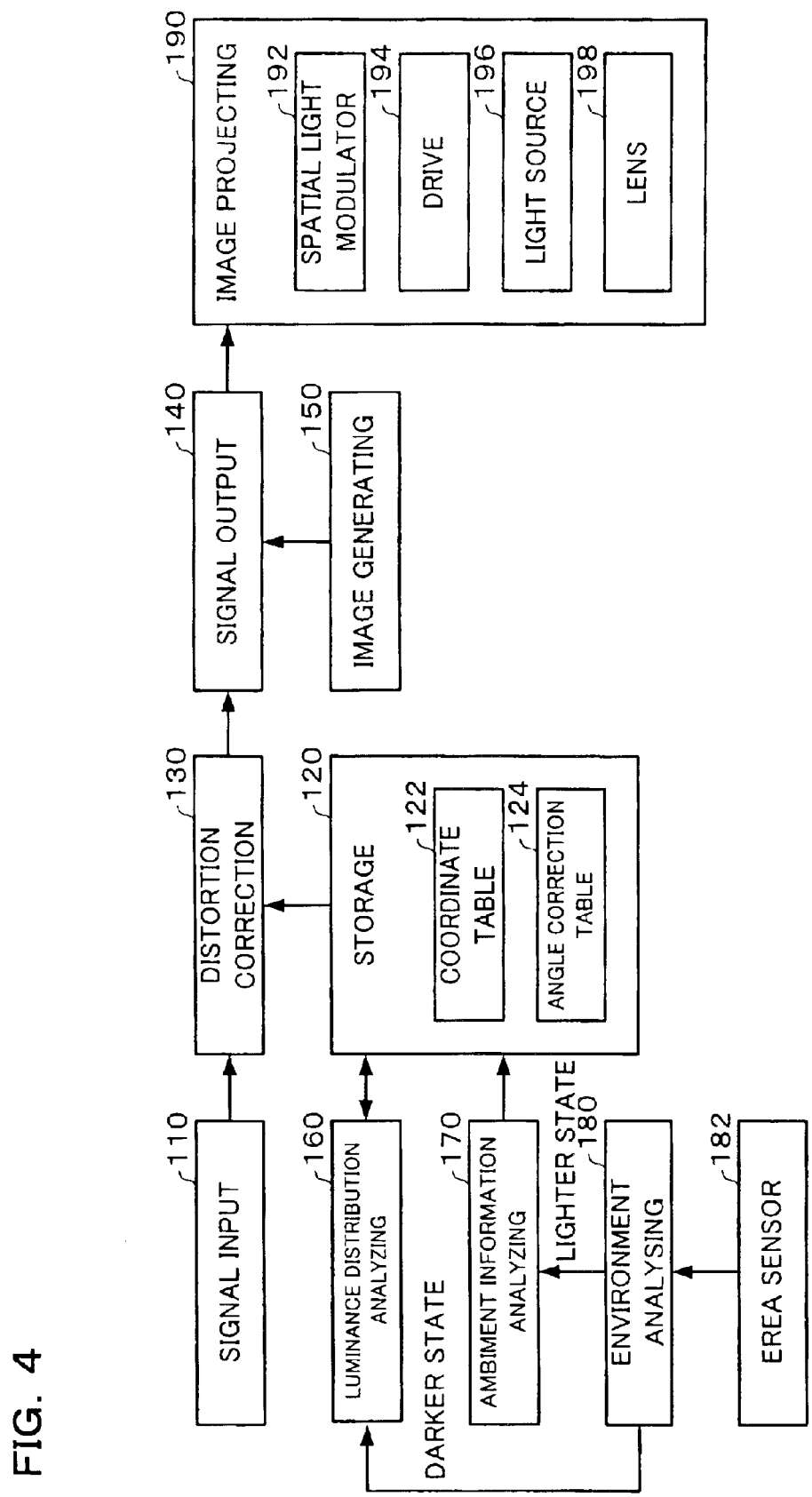
FIG. 4 is a functional block diagram of a projector according to one example of an embodiment of the present invention.

FIG. 4 is a functional block diagram of a projector 20 according to one example of this embodiment.

The projector 20 comprises a signal input section 110, a storage section 120, a distortion correction section 130, a signal output section 140, an image generating section 150, a luminance-distribution analyzing section 160, an ambient-information analyzing section 170, an environment analyzing section 180 and an image projecting section 190.

The sensor 30 comprises an area sensor section 182.

The signal input section 110 is operative to transform an analog image signal inputted from PC (Personal Computer) or the like into a digital image signal.

The storage section 120 has stored a coordinate table 122 indicating derivation coordinates for deriving the coordinates of the projection area 12 and an angle correction table 124 in which the ratio of average luminance values for a plurality of different parts in the projection area 12 is associated with the derivation coordinates of the projection area 12. The derivation coordinates may include, for example, coordinates in the coordinate axis of a liquid crystal light valve, coordinates in the coordinate axis of a projected image and absolute coordinates in three axes or X, Y and Z axes.

The data structures and contents in the coordinate table 122 and angle correction table 124 will be described below.

FIG. 5A is a view illustrating the contents of coordinate data 122 before corrected. FIG. 5B shows the contents of coordinate data 122 after corrected. FIG. 6 shows the data structure of the angle correction table 124 according to one example of this embodiment.

As shown in FIGS. 5A and 5B, the coordinate table 122 has coordinates in x and y axes for deriving four corners A, B, C and D or A', B', C' and D' in the projection area 12.

In the angle correction table 124, a ratio RH of average luminance values between two parts provided by horizontally dividing the projection area 12 and a ratio RV of average luminance values between two parts provided by vertically dividing the projection area 12 are respectively associated with derivation coordinates corresponding to the derivation coordinates in the coordinate table 122, as shown in FIG. 6. Thus, the projector 20 can uniformly determine the derivation coordinates by determining these ratios RH and RV.

The distortion correction section 130, which functions as image signal correction means, is operative to store image signals inputted from the image signal input section 110 and corresponding to one image and to correct the image signals based on the coordinate table 122 so that any distortion in the projected image can be corrected (or resized).

The concrete distortion correction technique may include a technique of correcting a distortion, for example, through the conventional perspective deformation.

The image generating section 150 is operative to generate image signals used to project a calibration image such as an all-black image (a monochromatic black image) or an all-white image (a monochromatic white image, these image signals being then outputted toward the signal output section 140.

In such a manner, the projector 20 can solely perform the calibration without need of calibration signals inputted from any external input device such as PC or the like into the projector 20 since the calibration image signals are internally generated within the projector 20. The image generating section 150 may be omitted if the calibration image signals can be inputted directly into the projector from the PC or the like.

The signal output section 140 is operative to receive the image signals corrected by the distortion correction section 130 and the calibration image signals from the image generating section 150 and to output these image signals toward the image projecting section 190 after they have been converted into analog image signals.

If the projector 20 uses only digital R, G and B signals, the A/D conversion at the signal input section 110 and the D/A conversion at the signal output section 140 may be omitted.

The image projecting section 190 comprises a spatial light modulator 192, a drive section 194 for driving the spatial light modulator 192, a light source 196 and a lens 198.

The drive section 194 is operative to drive the spatial light modulator 192 based on the image signals from the signal output section 140. And, the image projecting unit 190 projects the light from the light source 196S through the spatial light modulator 192 and lens 198.

The light source 196 may be any one of various light sources such as a point light source, surface light source and the like.

The environment analyzing section 180 according to this embodiment is operative to judge whether the environment is lighter or darker than a predetermined state, based on luminance information in the sensing information from the area sensor section 182.

For example, if an average luminance value Y is determined by: 0.3* R-signal value+0.6* G-signal value+0.1* B-signal value, it may be judged whether the environment is lighter or darker about a threshold value at which the average luminance value Y is equal about 60. This threshold is actually variable depending on the setting of the sensor 80 or the sensing region 14.

For the lighter state, the ambient-information analyzing section 170 updates the derivation coordinates in the coordinate table 122. For the darker state, the luminance-distribution analyzing section 160 updates the derivation coordinates in the coordinate table 122.

Hardware structure for implementing each part of the aforementioned projector 20 may be as follows.

Figure 7:
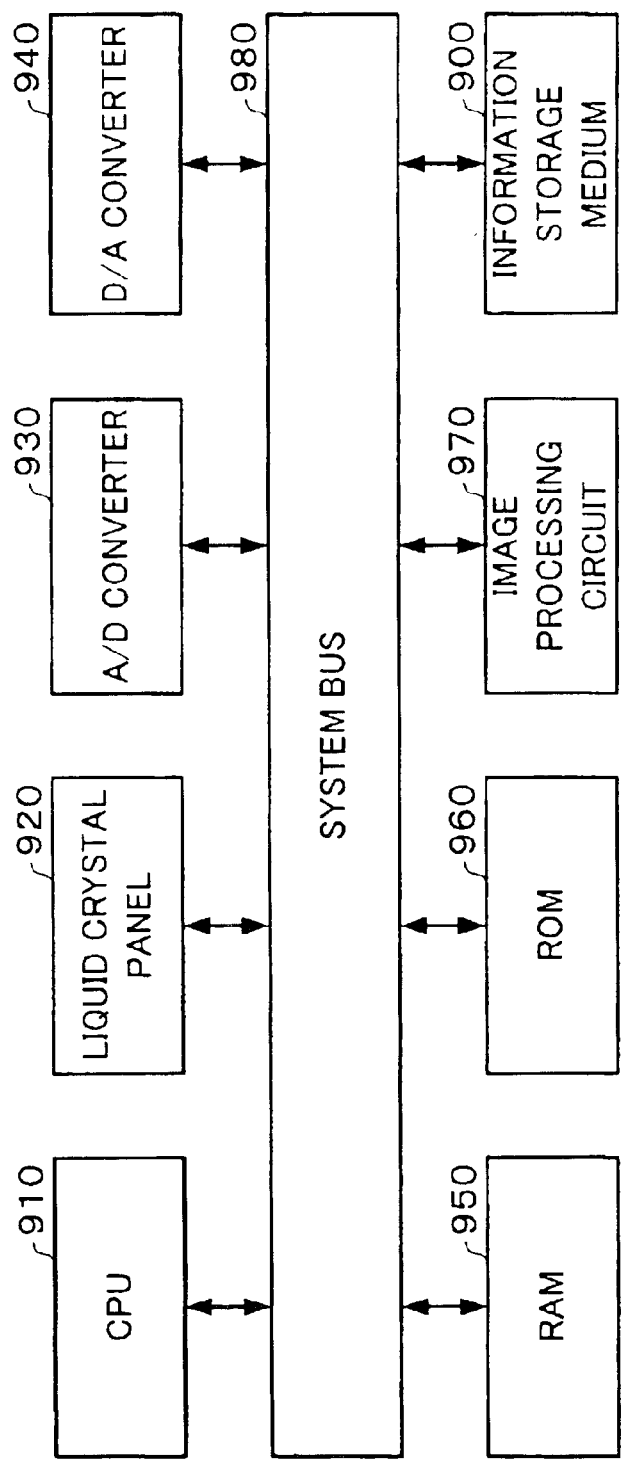
FIG. 7 is a hardware block diagram illustrating a projector according to one example of this embodiment.

FIG. 7 is a hardware block diagram illustrating a projector 20 according to one example of this embodiment.

For example, the signal input section 110 may be implemented by an A/D converter 930 or the like; the storage section 120 may be implemented by RAM 950 or the like; the distortion correction section 130, image generating section 150, luminance-distribution analyzing section 160, ambient-information analyzing section 170 and environment analyzing section 180 may be implemented by an image processing circuit 970, RAM 950, CPU 910 and the like, respectively; the signal output section 140 may be implemented by a D/A converter 940 or the like; and the spatial light modulator 192 may be implemented by a liquid crystal panel 920, ROM 960 for storing a liquid crystal light valve driver for driving the liquid crystal panel 920 or the like.

These sections can be configured to mutually deliver the information therebetween through a system bus 980.

The area sensor section 182 may be implemented by CCD sensor or the like.

These sections and portions may be implemented in a hardware manner or in a software manner such as drivers.

Furthermore, the functions of the luminance-distribution analyzing section 160 and others may be implemented by a computer according to a program read out from an information storage medium 900, which program is designed to cause the computer to function as the luminance-distribution analyzing section 160 and others.

Such an information storage medium 900 may be accomplished, for example, by CD-ROM, DVD-ROM, ROM, RAM, HDD or the like through either of the contact or non-contact type reading mode.

Rather than the information storage medium 900, the aforementioned functions can be implemented by downloading a program or the like for implementing them from a host device or the like through a transmission channel.

Flow of Image Processing

Next, the flow of image processing by use of these parts will be explained.

Figure 8:
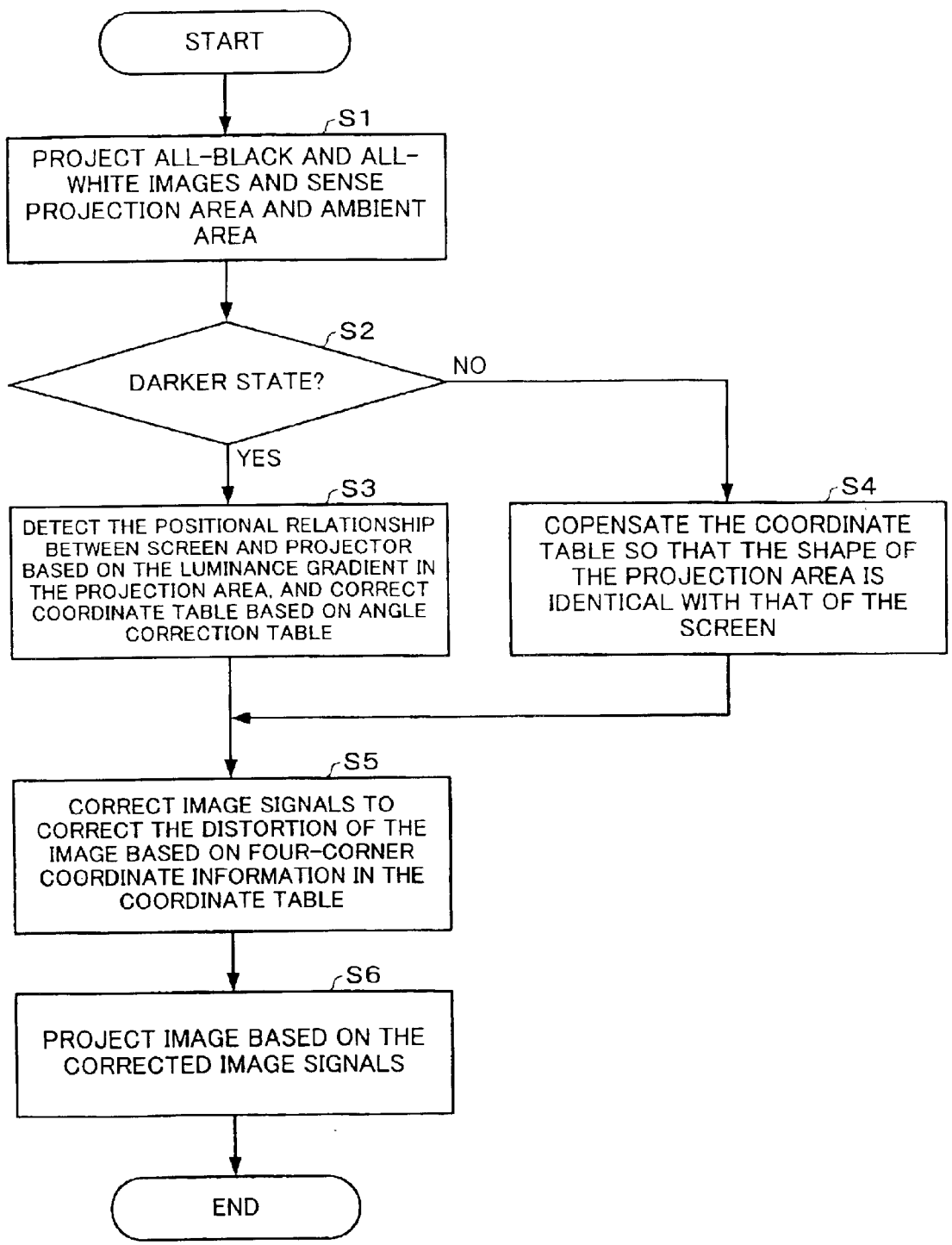
FIG. 8 is a flow chart illustrating a flow of image processing according to one example of this embodiment.

FIG. 8 is a flow chart illustrating a flow of image processing according to one example of this embodiment.

After the projector 20 has been activated, the image generating section 150 generates image signals used to project an all-black calibration image and an all-white calibration image, these image signals being then transferred to the image projecting section 190 through the signal output section 140.

The image projecting section 190 then projects the all-black image and all-white image onto the screen 8 based on the image signals. As each of the calibration images is projected onto the screen 8, the area sensor section 182 senses the sensing region 14 including the screen region 10 and the projection area 12 (step S1).

The area sensor section 182 then transfers the imaging information of all-black and all-white images to the environment analyzing section 180.

The environment analyzing section 180 generates the difference information provided by subtracting the imaging information of the all-black image from the imaging information of the all-white image and detects the amount of changed luminance based on the difference information. And, the environment analyzing section 180 discriminates the projection area 12 included in the sensing region 14, based on the detected amount of changed luminance.

The environment analyzing section 180 then compares the average luminance value in the projection area 12 with a threshold to judge whether the environment is lighter or darker than a predetermined state (step S2).

If the environment analyzing section 180 judges that the average luminance value in the projection area 12 is darker than the threshold, the environment analyzing section 180 then transfers the imaging information of the all-black and all-white images and the coordinate information of the projection area 12 toward the luminance-distribution analyzing section 160.

The luminance-distribution analyzing section 160 computes the average luminance value between the divided image parts and then the ratio of average luminance value between the respective image parts.

Figure 9A:
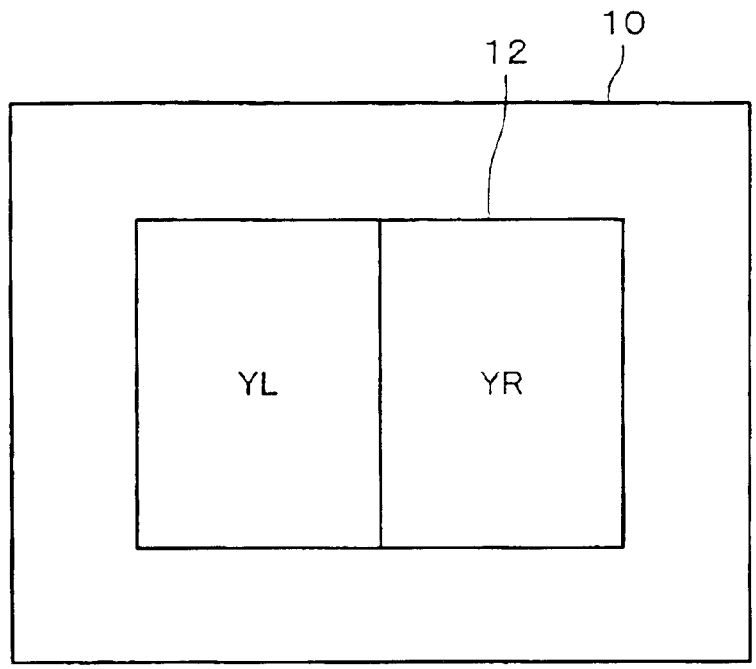
FIG. 9A is a schematic diagram of an image divided into two in the vertical direction.
Figure 9B:
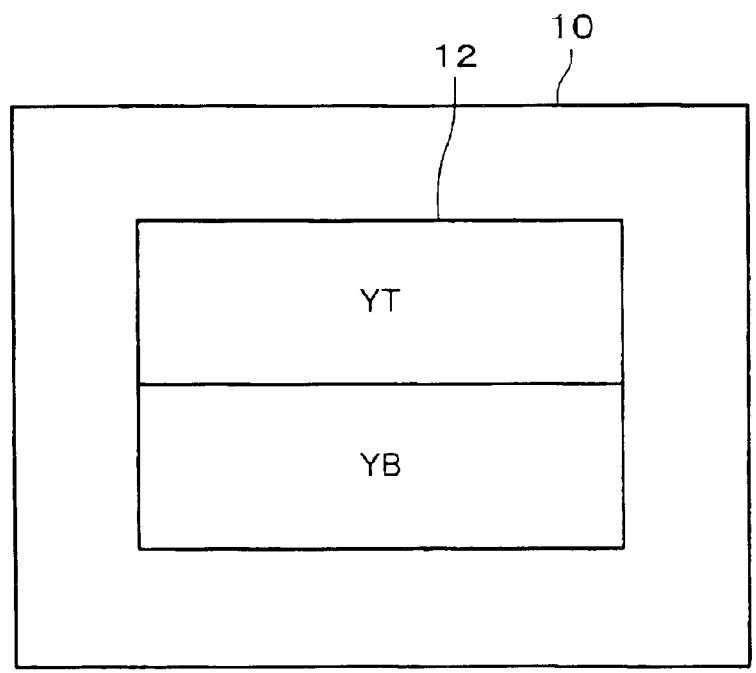
FIG. 9B is a schematic diagram of an image divided into two in the horizontal direction.

FIG. 9A is a schematic diagram of an image divided into two in the vertical direction and FIG. 9B is a schematic diagram of an image divided into two in the horizontal direction.

It is now assumed that the projection area 12 is divided into right and left parts and that the average luminance value in the left part is YL while the average luminance value in the right part is YR, as shown in FIG. 9A. It is further assumed that the projection area 12 is divided into upper and lower parts and that the average luminance value in the upper part is YT while the average luminance value in the lower part is YB, as shown in FIG. 9B.

The luminance-distribution analyzing section 160 determines that YR/YL is the horizontal ratio RH if YR is equal to or higher than YL; that –(YL/YR) is RH if YR is less than YL; that YT/YB is the vertical ratio RV if YT is equal to or higher than YB; and that –(YB/YT) is RV if YT is less than YB.

And, the luminance-distribution analyzing section 160 refers to the angle correction table 124 to acquire x and y values for four points A', B', C' and D' which respectively indicate the derivation coordinates corrected depending on the values RH and RV.

The luminance-distribution analyzing section 160 further writes the respective acquired x and y values for the four points A', B', C' and D' into the coordinate table 122 to update it.

As described, for the darker state, the luminance-distribution analyzing section 160 detects the positional relationship between the screen 8 and projector 20 based on the luminance gradient in the projection area 12 and corrects the coordinate table 122 based on the angle correction table 124 (step S3).

If the environment analyzing section 180 judges that the average luminance value in the projection area 12 is lighter than the threshold, the environment analyzing section 180 then transfers the imaging information of the all-black and all-white images and the coordinate information of the projection area 12 toward the ambient-information analyzing section 170.

The ambient-information analyzing section 170 detects the coordinate information in the screen region 10 based on the luminance distribution from the imaging information of the all-black image.

If the screen region 10 is completely included in the projection area 12, the ambient-information analyzing section 170 corrects the coordinate table 122 using the coordinates for four corners in the screen region 10 and based on the coordinate information of the projection area 12 and the coordinate information of the screen region 10.

Figure 11:
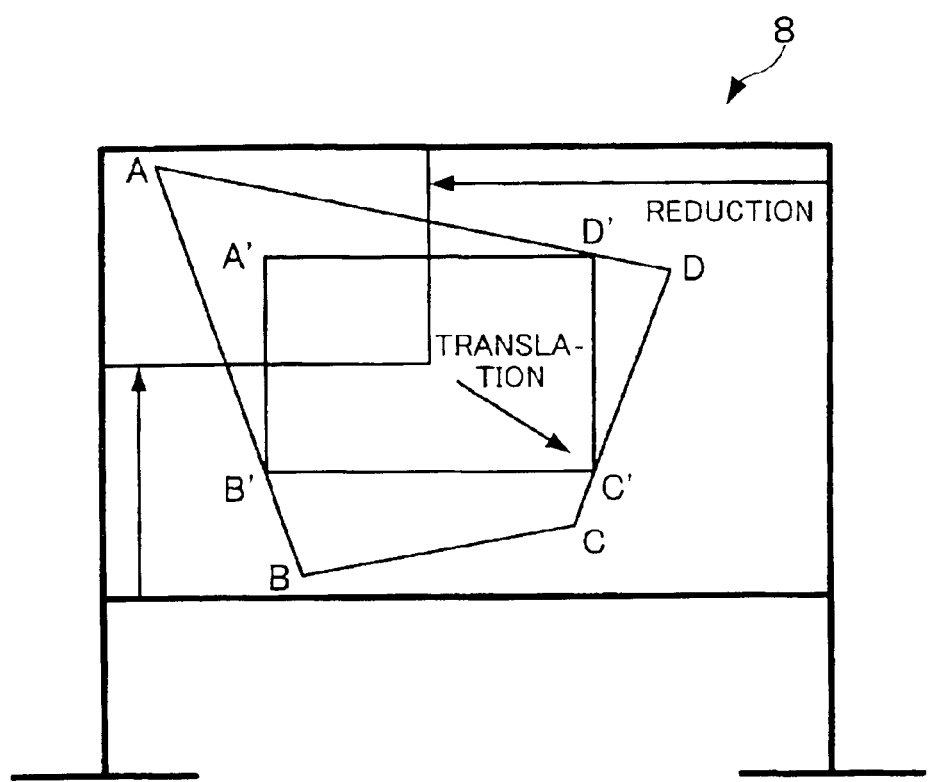
FIG. 11 is a schematic diagram showing an image after its keystone distortion has been corrected according to another example of this embodiment.

If the screen region 10 is not completely included in the projection area 12, the ambient-information analyzing section 170 sets a rectangle consisted of four corner coordinates in the screen region 10 and reduces and translates the rectangle such that the rectangle is completely included in the interior of the projection area 12, as shown in FIG. 11. The ambient-information analyzing section 170 then corrects the coordinate table 122 using the four corner coordinates at a point of time when the rectangle is completely included in the projection area 12.

The portion of the projection area 12 which has been hidden through these procedures may display an image having a color (e.g., black) identical with that of the screen region 10.

As described, for the lighter state, the ambient-information analyzing section 170 corrects the coordinate table 122 to match the configuration of the projection area 12 to the screen region 10 (step S4).

The distortion correction section 130 then corrects the image signals to correct the distortion of the image based on the four-corner coordinate deriving information included in the coordinate table 122 which has been corrected by the luminance-distribution analyzing section 160 or ambient-information analyzing section 170 (step S5).

The image projecting section 190 then projects an image based on the corrected image signals (step S6).

Through the above-mentioned procedure, the projector 20 projects the image in which any keystone distortion has been corrected.

Figure 10:
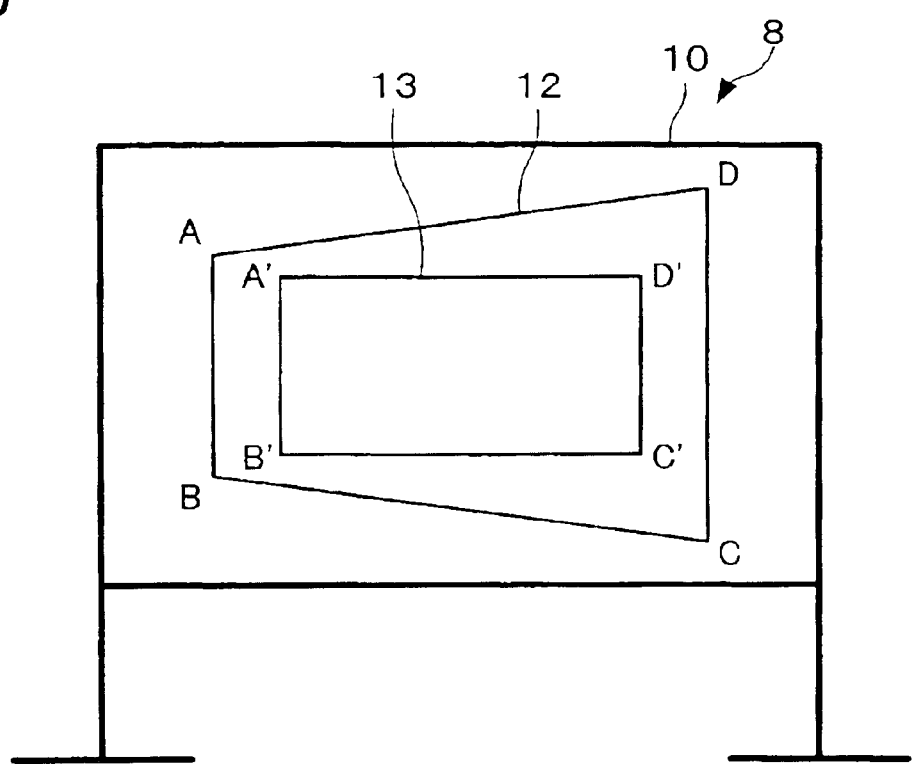
FIG. 10 is a schematic diagram showing an image after its keystone distortion has been corrected according to one example of this embodiment.

FIG. 10 is diagrammatic view showing an image after its keystone distortion has been corrected according to one example of this embodiment.

For example, before the projection area 12 is corrected, it may be in the form of such a trapezoid as shown by a tetragon ABCD. However, the projector 20 can form a projection area 13 into such a rectangular shape as shown by A'B'C'D', by correcting the image signals.

As described, according to this embodiment, the projector 20 can determine a distortion in the projection area 12 based on the distribution of luminance value. Thus, the projector 20 can adequately discriminate the image distortion even in such a case that it is difficult to discriminate the distortion from the shape of the sensed image since the optical axes of the lens 198 and sensor 30 are identical with each other. Thus, the distortion in the projected image can be corrected automatically and adequately. A sensor having its lower resolution can be applied as the sensor 30 since it is not necessary to exactly determine the shape of the projection area 12 and since only the luminance distribution in the projection area 12 is required.

According to this embodiment, the image distortion can adequately be corrected by discriminating whether the environment is lighter or darker. If it is difficult to discriminate any change in the luminance value, such correction can be accomplished by updating four derivation coordinates in the coordinate data 122 using the positional information relating to the respective vertexes on the screen region 10. Thus, the projector 20 can be applied in various kinds of operating environments.

Modifications

Although the preferred embodiment of the present invention has been described, the present invention is not limited to the aforementioned forms.

Although the embodiment has been described as to the keystone distortion in the projection area 12, the projector 20 can correct the image even if the distortion on the projection area 12 is due to rotation.

Figure 12:
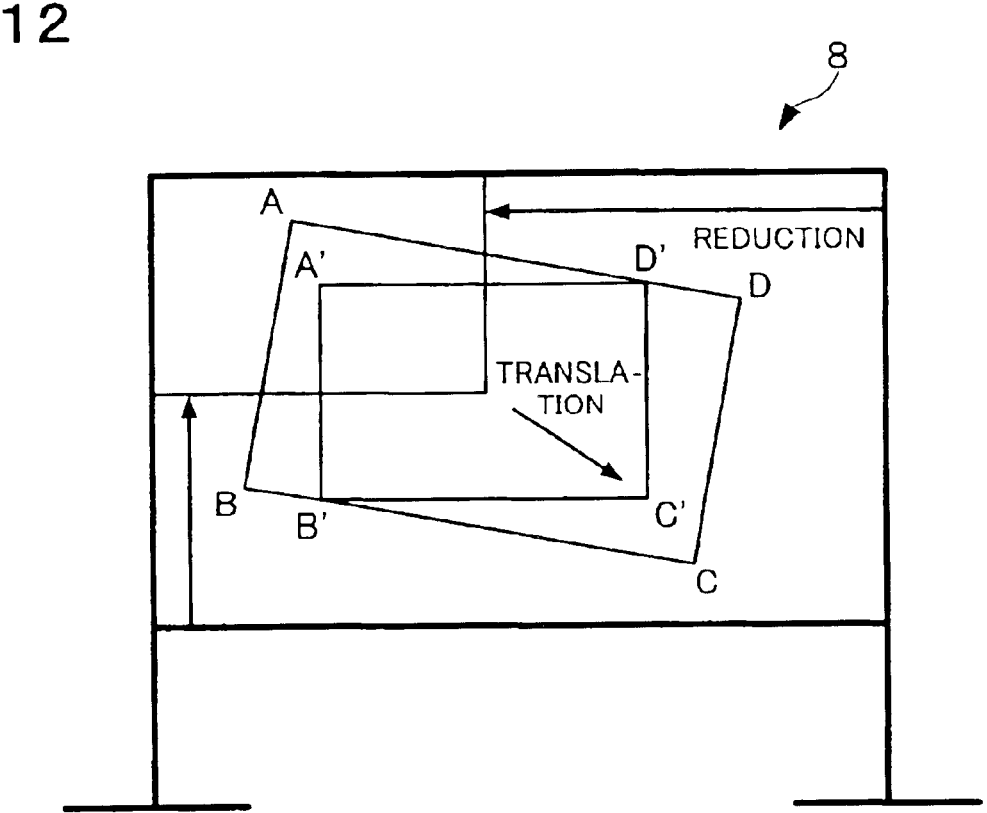
FIG. 12 is a schematic diagram showing a corrected image that had been rotated, according to one example of this embodiment.

FIG. 12 is diagrammatic view illustrating a corrected image which had been rotated according to one example of this embodiment.

In this case, the ambient-information analyzing section 170 sets a rectangle comprising coordinates for four corners on the screen region 10, and reduces and translates the rectangle so that it is completely included in the interior of the projection area 12. The ambient-information analyzing section 170 then corrects the coordinate table 122 using the four corner coordinates at a point of time when the rectangle is completely included in the projection area 12.

Moreover, an inclination or gravity sensor may be mounted in the projector 20 such that the vertical distortion in a trapezoid can be corrected by such a sensor while the horizontal distortion in the trapezoid can be corrected based on the sensing information from the sensor 30.

If a lens 198 has a zooming function, the projector 20 may acquire information relating to the zooming (e.g., numerical values as represented by zero at the maximum telescopic sight and by one at the maximum pantoscopic sight) and then correct the keystone distortion based on this information.

Thus, the keystone distortion can be corrected automatically and adequately even if the telescopic or pantoscopic function is to be used.

Although the embodiment has been described as to the projection area 12 divided into two vertical or horizontal regions by the projector 20 as shown in FIGS. 9A and 9B, the projection area 12 may be divided into plural regions other than two (e.g., four, nine or others). In this case, the projector 20 may determine the average luminance value for each of the divided regions for image processing.

Although the embodiment has been described as to the angle correction table 124 that causes the ratio of average luminance between the different regions in the projection area 12 to be associated with the derivation coordinates in the projection area 12, the ratio of average luminance value may be replaced by a differential value in the average luminance value.

Although the embodiment has been described as to the all-white and black calibration images, the present invention is not limited to such calibration images and can be applied to any of various kinds of calibration images.

Although the embodiment has been described as to the projector 20 functioning as an image processing system, the present invention is effectively applied to any one of various front-projection type image display devices other than the projector 20.

The projector 20 may be a liquid crystal projector or a projector using DMD (Digital Micromirror Device). DMD is a trademark possessed by the U. S. Texas Instruments.

In addition, the function of the projector 20 may be accomplished solely by the projector 20 or by a plurality of decentralized processing units (e.g., one projector and one PC).

Furthermore, the projector 20 may be separated from the sensor 30 or they may be formed as one unit.

What is claimed is:

1. An image processing system comprising:
   sensing means for sensing a sensing region onto which a predetermined image is projected and for outputting sensing information;
   luminance distribution analysis means for analyzing a luminance distribution in a projection area included in the sensing region, based on the sensing information;
   storage means for storing angle correction data in which ratio of average luminance values for a plurality of different regions in the projection area is associated with derivation coordinates for deriving coordinates of the projection area, and also for storing coordinate data indicating the derivation coordinates for the projection area; and
   image signal correction means for correcting image signals based on the coordinate data so that a distortion in the projected image is corrected,
   wherein the luminance distribution analysis means refers to the angle correction data depending on the luminance distribution in the projection area to correct the derivation coordinates in the coordinate data based on the angle correction data.

2. The image processing system as defined in claim 1, further comprising:
   ambient information analysis means for determining the projection area and a screen region included in the sensing region based on the luminance distribution according to the sensing information when a rectangular image is to be projected on a rectangular screen, and for updating four derivation coordinates in the coordinate data based on positional information of each vertex in the determined projection area and screen region and derivation coordinate information of four corners in the screen region.

3. The image processing system as defined in claim 2, further comprising:
   environment analysis means for determining a lighter state or a darker state based on the luminance information according to the sensing information, the lighter state being a state lighter than a predetermined state and the darker state being a state darker than the predetermined state,
   wherein in the lighter state, the ambient information analysis means updates the derivation coordinates in the coordinate data, and in the darker state, the luminance distribution analysis means updates the derivation coordinates in the coordinate data.

4. An image processing system comprising:
   a sensing section which senses a sensing region onto which a predetermined image is projected and for outputting sensing information;
   a luminance distribution analysis section which analyzes a luminance distribution in a projection area included in the sensing region, based on the sensing information;
   a storage section which stores angle correction data in which ratio of average luminance values for a plurality of different regions in the projection area is associated with derivation coordinates for deriving coordinates of the projection area, and also for storing coordinate data indicating the derivation coordinates for the projection area; and
   an image signal correction section which corrects image signals based on the coordinate data so that a distortion in the projected image is corrected,
   wherein the luminance distribution analysis section refers to the angle correction data depending on the luminance distribution in the projection area to correct the derivation coordinates in the coordinate data based on the angle correction data.

5. A projector comprising:
   sensing means for sensing a sensing region onto which a predetermined image is projected and for outputting sensing information;
   luminance distribution analysis means for analyzing a luminance distribution in a projection area included in the sensing region, based on the sensing information;
   storage means for storing angle correction data in which ratio of average luminance values for a plurality of different regions in the projection area is associated with derivation coordinates for deriving coordinates of the projection area, and also for storing coordinate data indicating the derivation coordinates for the projection area; and image signal correction means for correcting image signals based on the coordinate data so that a distortion in the projected image is corrected; and image projection means for projecting an image based on the corrected image signals, wherein the luminance distribution analysis means refers to the angle correction data depending on the luminance distribution in the projection area to correct the derivation coordinates in the coordinate data based on the angle correction data.

6. A projector comprising:

a sensing section which senses a sensing region onto which a predetermined image is projected and for outputting sensing information;

a luminance distribution analysis section which analyzes a luminance distribution in a projection area included in the sensing region, based on the sensing information;

a storage section which stores angle correction data in which ratio of average luminance values for a plurality of different regions in the projection area is associated with derivation coordinates for deriving coordinates of the projection area, and also for storing coordinate data indicating the derivation coordinates for the projection area; and an image signal correction section which corrects image signals based on the coordinate data so that a distortion in the projected image is corrected; and an image projection section which projects an image based on the corrected image signals, wherein the luminance distribution analysis section refers to the angle correction data depending on the luminance distribution in the projection area to correct the derivation coordinates in the coordinate data based on the angle correction data.

7. A computer-readable program for causing a computer to function as:

sensing control means for causing sensing means to sense a sensing region onto which a predetermined image is projected and for outputting sensing information;

luminance distribution analysis means for analyzing a luminance distribution in a projection area included in the sensing region, based on the sensing information;

storage control means for storing region angle correction data in which ratio of average luminance values for a plurality of different regions in the projection area is associated with derivation coordinates for deriving coordinates of the projection area at a predetermined storage, and also for storing coordinate data indicating the derivation coordinates for the projection area at the predetermined storage; and image signal correction means for correcting image signals based on the coordinate data so that a distortion in the projected image is corrected, wherein the luminance distribution analysis means refers to the angle correction data depending on the luminance distribution in the projection area to correct the derivation coordinates in the coordinate data based on the angle correction data.

8. A computer-readable information storage medium storing the program as defined in claim 7.

9. An image processing method comprising:

sensing a sensing region onto which a predetermined image is projected and outputting sensing information;

analyzing a luminance distribution in a projection area included in the sensing region, based on the sensing information;

referring angle correction data in which ratio of average luminance values for a plurality of different regions in the projection area is associated with derivation coordinates for deriving coordinates of the projection area;

correcting the derivation coordinates in coordinate data indicating the derivation coordinates for the projection area based on the angle correction data; and correcting image signals based on the coordinate data so that a distortion in the projected image is corrected.

10. The image processing method as defined in claim 9, further comprising:

determining the projection area and a screen region included in the sensing region based on the luminance distribution according to the sensing information when a rectangular image is to be projected on a rectangular screen; and updating four derivation coordinates in the coordinate data based on positional information of each vertex in the determined projection area and screen region and derivation coordinate information of four corners in the screen region.

11. The image processing method as defined in claim 10, further comprising:

determining a lighter state or a darker state based on the luminance information according to the sensing information;

in the lighter state, updating four derivation coordinates in the coordinate data based on the positional information and derivation coordinate information for four corners in the screen region; and in the darker state, analyzing the luminance distribution in the projection area based on the sensing information; referring to the angle correction data depending on the luminance distribution in the projection area, and correcting the derivation coordinates in the coordinate data based on the angle correction data.

* * * * *